(12) United States Patent
Chen et al.

(10) Patent No.: US 12,147,432 B2
(45) Date of Patent: Nov. 19, 2024

(54) HYBRID DATA PROCESSING SYSTEM AND METHOD

(71) Applicant: LEMON INC., Grand Cayman (KY)

(72) Inventors: Jianjun Chen, Los Angeles, CA (US); Yonghua Ding, Los Angeles, CA (US); Ye Liu, Los Angeles, CA (US); Fangshi Li, Los Angeles, CA (US); Lixun Cao, Beijing (CN); Yang Liu, Beijing (CN); Li Zhang, Los Angeles, CA (US); Mingyi Zhang, Los Angeles, CA (US); Lei Zhang, Beijing (CN); Rui Shi, Beijing (CN)

(73) Assignee: LEMON INC., Grand Cayman (KY)

( * ) Notice: Subject to any disclaimer, the term of this patent is extended or adjusted under 35 U.S.C. 154(b) by 78 days.

(21) Appl. No.: 17/462,998

(22) Filed: Aug. 31, 2021

(65) Prior Publication Data

US 2023/0066540 A1  Mar. 2, 2023

(51) Int. Cl.
*G06F 16/2457* (2019.01)
*G06F 16/178* (2019.01)
(Continued)

(52) U.S. Cl.
CPC .... *G06F 16/24575* (2019.01); *G06F 16/1794* (2019.01); *G06F 16/2433* (2019.01);
(Continued)

(58) Field of Classification Search
CPC ........... G06F 16/24575; G06F 16/2433; G06F 16/258; G06F 16/278; G06F 16/1794; G06F 16/27
See application file for complete search history.

(56) References Cited

U.S. PATENT DOCUMENTS 7,620,660 B2  11/2009  Kodavalla et al.
10,002,175 B2  6/2018  Kemper et al.
(Continued)

FOREIGN PATENT DOCUMENTS

CN  111858759 A  10/2020
CN  112363873 A  2/2021
CN  111858759 B  6/2021

OTHER PUBLICATIONS

International Patent Application No. PCT/SG2022/050540; Int'l Search Report; dated Mar. 12, 2023; 5 pages.
(Continued)

*Primary Examiner* — Hosain T Alam
*Assistant Examiner* — Lin Lin M Htay
(74) *Attorney, Agent, or Firm* — BakerHostetler

(57) ABSTRACT

The present disclosure describes hybrid transactional and analytical processing (HTAP) techniques. A HTAP system comprises a first processing engine configured to perform online transactional processing, a second processing engine configured to perform online analytical processing, and a storage in communication with the first processing engine and the second processing engine. The first processing engine, the second processing engine, and the storage may be modularized and configured to be decoupled from each other. The system may be configured to capture data by the first processing engine in real time, organize the data in a first format in a first part of the storage for use by the first processing engine, propagate the data to a second part of the storage subsystem, and organize the data in a second format in the second part of the storage for use by the second processing engine.

18 Claims, 12 Drawing Sheets

(51) Int. Cl.
  *G06F 16/242* (2019.01)
  *G06F 16/25* (2019.01)
  *G06F 16/27* (2019.01)
(52) U.S. Cl.
  CPC ............ *G06F 16/258* (2019.01); *G06F 16/27* (2019.01); *G06F 16/278* (2019.01)

(56) References Cited

U.S. PATENT DOCUMENTS

| | | | |
|---|---|---|---|
| 2011/0178984 | A1 | 7/2011 | Talius et al. |
| 2013/0073513 | A1 | 3/2013 | Kemper et al. |
| 2014/0052743 | A1 | 2/2014 | Schauer et al. |
| 2014/0279900 | A1 | 9/2014 | Gupta et al. |
| 2016/0103877 | A1 | 4/2016 | Ozcan et al. |
| 2016/0224253 | A1 | 8/2016 | Tuers et al. |
| 2016/0248866 | A1* | 8/2016 | Garas ................... G06F 16/9574 |
| 2017/0011012 | A1* | 1/2017 | Das ....................... G06T 7/0002 |
| 2017/0366624 | A1 | 12/2017 | Tsang et al. |
| 2018/0150490 | A1 | 5/2018 | Lipcon |
| 2018/0196694 | A1* | 7/2018 | Banerjee ................ H04L 67/01 |
| 2019/0325055 | A1 | 10/2019 | Lee et al. |
| 2021/0081403 | A1 | 3/2021 | Tian |
| 2021/0357407 | A1* | 11/2021 | Bok ................... G06F 16/24542 |
| 2021/0365469 | A1* | 11/2021 | Brunswig ............. G06F 16/252 |

OTHER PUBLICATIONS

Huang et al.; "TiDB: A Raft based HTAP Database"; Proceedings of the VLDB Endowment; vol. 13 No. 12; Sep. 2020; p. 3072-3084.

Lee et al.; "SAP HANA Distributed In-Memory Database System: Transaction, Session, and Metadata Management"; 29th IEEE Int'l Conf. on Data Engineering; Dec. 2013; 9 pages.

Lee et al.; "Parallel Replication across Formats in SAP HANA for Scaling Out Mixed OLTP/OLAP Workloads"; Proceedings of the VLDB Endowment; vol. 10 No. 12; Aug. 2017; p. 1598-1609.

International Patent Application No. PCT/SG2022/050550; Int'l Search Report; dated Apr. 24, 2023; 3 pages.

Lang et al.; "Data Blocks: Hybrid OLTP and OLAP on Compressed Storage using both Vectorization and Compilation"; Int'l Conf. on Management of Data SIGMOD; 2016; p. 311-326.

International Patent Application No. PCT/SG2022/050549; Int'l Search Report; dated Mar. 13, 2023; 5 pages.

Muhlbauer et al.; "ScyPer: Elastic OLAP Throughput on Transactional Data"; Proceedings of the Second Workshop on Data Analytics in the Cloud; Jun. 2013; p. 11-15.

Chen et al.; "ByteHTAP: ByteDance's HTAP System with High Data Freshness and Strong Data Consistency"; Proceedings of the VLDB Endowment; vol. 15 No. 12; Aug. 2022; p. 3411-3424.

Kolodner et al.; "Atomic Incremental Garbage Collection and Recovery for a Large Stable Heap"; ACM SIGMOD; Jun. 1993; p. 177-186.

Ahn et al.; "Designing an Efficient Replicated Log Store with Consensus Protocol"; 11th USENIX Conf. on Hot Topics in Cloud Computing; 2019; 7 pages.

European Patent Application No. 22865178.2; Extended Search Report; dated Sep. 9, 2024; 6 pages.

Raza et al.; "Adaptive HTAP through Elastic Resource Scheduling"; SIGMOD; Jun. 2020; pp. 2043-2054.

* cited by examiner

HYBRID DATA PROCESSING SYSTEM AND METHOD

BACKGROUND

Data processing refers to the process of performing specific operations on a set of data or a database. A database is an organized collection of facts and information, such as records on inventory, customers, and so on. Numerous forms of data processing exist and serve diverse applications in the business setting. As databases are increasingly used to store large amounts of complex data, improvements in data processing techniques may be desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
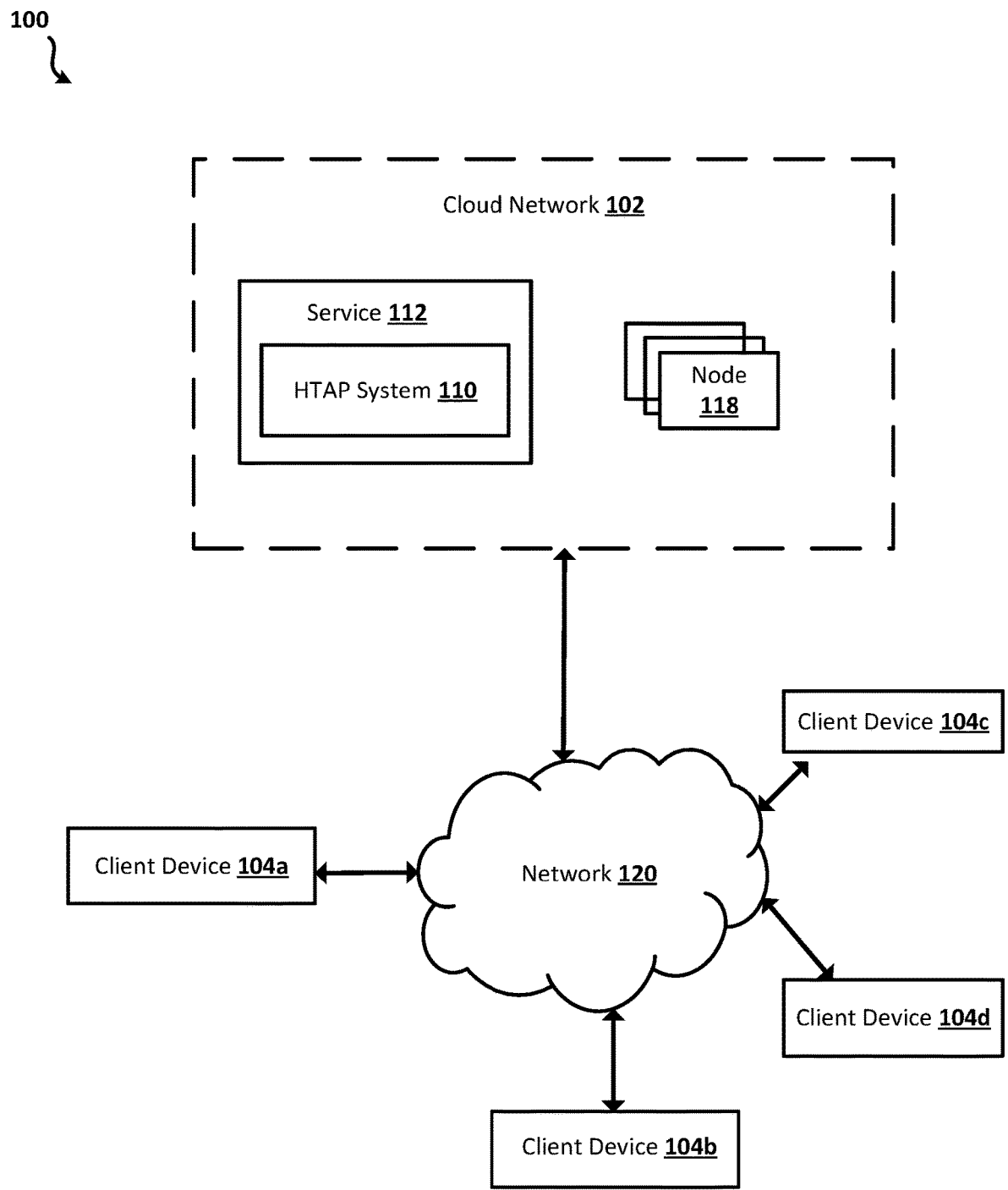
FIG. 1 shows an example system including a cloud service.

Online analytical processing (OLAP) systems enable users to analyze multidimensional data interactively from multiple perspectives. Multidimensional data includes data sets with three or more dimensions. OLAP systems allow users to analyze information from multiple database systems at the same time. OLAP systems enables analysts to extract and view data, such as business data, from different points of view. Analysts frequently need to group, aggregate, and join data. These OLAP operations in data mining are resource intensive. With OLAP, data can be pre-calculated and pre-aggregated, making analysis faster. However, traditionally OLAP systems typically bulk load large amounts of data periodically. This may cause OLAP systems to suffer from the problem of stale data.

OLAP is typically contrasted to OLTP (online transaction processing) systems. OLTP systems capture, store, and process data from transactions. OLTP systems are generally characterized by less complex queries, in a larger volume, to process transactions rather than for the purpose of business intelligence or reporting. Traditional OLTP systems are able to support data manipulation language (DML). DML is a computer programming language used for adding (inserting), deleting, and modifying (updating) data in a database. Traditional OLTP systems may also be able to support point look-up queries efficiently.

Noticeable differences exist between OLAP systems and OLTP systems. For example, OLTP systems typically do not have massive parallel query engines (such as those present in OLAP systems) to support efficient complex query processing over large amount of data. As another example, OLAP systems are mostly optimized for read only and may not support other kinds of queries, whereas OLTP systems process all kinds of queries (read, insert, update, and delete). As yet another example, OLTP systems are associated with short atomic transactions, whereas OLAP systems allow for more flexible distribution patterns and higher scalability, but with increased latency and without guaranteed upper bound to processing time.

Many prevailing data platforms/systems focus on only one of these workloads (e.g., either OLAP or OLTP). However, many scenarios (e.g., business scenarios) require both the performance of complex OLAP-like analysis over freshly imported data and the transaction support and strong data consistencies offered by OLTP systems. Hybrid transaction/analytical processing (HTAP) systems are most suitable for such scenarios.

HTAP systems offers several unique advantages. In a HTAP system, OLAP and OLTP workloads are united within a single system. By uniting OLAP and OLTP workloads within a single system, the complexity and cost for deployment and maintenance are significantly reduced. Such a versatile system can significantly reduce staleness in the query results (such staleness is usually introduced by the time-consuming and costly ETL process from operational databases to data warehouses). Such a system also has the capability for complex analysis over real-time data, thus addressing modern business models that usually require an effective response to transient opportunities that must be exploited in real-time.

However, many existing HTAP systems have downsides. First, many existing HTAP systems integrate the OLAP query engine as an extension on a transactional database, which cannot easily prevent the interference between the analytic query and the transactional workload. Users/designers may have to trade-off between read consistency and analytic performance for such systems. Second, many existing HTAP systems choose to maintain one type of the data, and thus have to choose a fixed format for the base data. Since OLTP workloads inherently perform better with row-based data format and OLAP workloads prefer columnar data format, using one format for both workloads means that performance of the HTAP system is compromised. Third, many HTAP systems use a memory store to handle certain (OLTP or OLAP) workloads. The cost of such systems is usually high because of the extensive usage of memories. Performance of such systems is a real concern if data cannot fit into the memory. Accordingly, a HTAP system that addresses these shortcomings is desirable.

A HTAP system that is able to handle business scenarios with both transactional (OLTP) workloads and complex analytical (OLAP) workloads is described herein. Unlike existing HTAP systems, the HTAP system described herein utilizes a large-scale, real-time analytics architecture that facilitates fresh data changes and strong data consistency. The improved HTAP system has the ability to orchestrate large amounts of computation and storage resources (or even more, the ability to scale out) to handle large scale user workloads. It is assumed that the data amount is large and will not fit in memory and that the data needs to be persisted. The improved HTAP system provides fast (e.g., real-time) data manipulation language (DML) query processing over row store in the OLTP engine. The improved HTAP system also facilitates distributed query processing for complex OLAP queries, including joins, aggregates, etc. The improved HTAP system also facilitates fresh data changes and strong data consistency. Data changes are continuously applied to an in-memory distributed delta store. This allows the OLAP engine to query up to date OLTP data changes. The improved HTAP system can provide a global snapshot isolation across OLTP and OLAP engines and supports OLAP queries to read latest updates in the current system-thus ensuring strong data consistency.

The improved HTAP system features a flexible modularized design. The major components of the system (such as the OLTP query engine, OLAP query engine and/or the underlying storage) are modularized and decoupled. As a result, the components can be easily changed without the hassle of modifying the whole architecture. The modularized design also makes scaling out of each component much easier.

An HTAP system, such as the improved HTAP system described above, may be utilized by a variety of different systems or entities. FIG. 1 illustrates an example system 100 that includes an HTAP system. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide service(s) via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a service 112. The service 112 may comprise a content streaming service, such as an Internet protocol video streaming service. The service 112 may be configured to distribute content via a variety of transmission techniques. The service 112 is configured to provide the content, such as video, audio, textual data, a combination thereof, and/or the like. The content may comprise content streams (e.g., video stream, audio stream, information stream), content files (e.g., video file, audio file, text file), and/or other data. The content may be stored in a database. For example, the service 112 may comprise a video sharing service, a video hosting platform, a content distribution platform, a collaborative gaming platform, and/or the like. The service 112 may comprise any other type of service in addition to, or instead of, a content streaming service.

In an embodiment, the service 112 may be provided to the client devices 104 via the network 120. If the service 112 is a content streaming service, content may be output to different client devices 104 via the network 120. The content may be streamed to the client devices 104. The content stream may be a stream of short videos received from the service 112. The plurality of client devices 104 may be configured to access the content from the service 112. In an embodiment, a client device 104 may comprise an application. The application outputs (e.g., display, render, present) the content to a user associated with the client device 104. The content may comprise videos, audio, comments, textual data and/or the like.

In an embodiment, a user may use the application on a client device 104 to create content and upload the short video to the cloud network 102. The client devices 104 may access an interface of the application. The interface may comprise an input element. For example, the input element may be configured to allow users to create the content. To create the content, the user may give the application permission to access an image capture device, such as a camera, or a microphone of the client device 104. After the user has created the content, the user may use the application to upload the content to the cloud network 102 and/or to save the content locally to the user device 104. The service 112 may store the uploaded content and any metadata associated with the content in one or more databases.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The plurality of computing nodes 118 may process tasks associated with the service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the service 112 comprises an HTAP system 110. The HTAP system 110 may comprise a plurality of different components (e.g., subsystems). For example, the HTAP system 110 may comprise one or more of a transactional OLTP engine, an analytic OLAP engine, an underlying decoupled storage, a metadata service, and/or a smart proxy. The architecture of the HTAP system 110 is discussed in more detail below with regards to FIGS. 3a-7. Additional details about each of the subsystems are also discussed in more detail below with regards to FIGS. 3a-7.

The HTAP system 110 may have an architecture that supports heterogeneous query engines. The architecture may have the capability to handle both transactional OLTP workloads and complex analytic (OLAP) workloads. The architecture may follow a modularized design and its major components may be fully decoupled, providing flexibility and easy scaling out. For example, the components of the HTAP system 110 may be easily changed to similar established subsystems. The architecture may eliminate the interference between OLTP and OLAP workloads by having separate query processing engines and with different data copies.

The HTAP system 110 may keep user data in different formats for the OLTP engine and the OLAP engine. For example, the HTAP system 110 may keep user data in row format for the OLTP engine and columnar format for the OLAP engine for efficient query processing. The architecture may have a single point truth of metadata and may use a standalone metadata service to provide the latest metadata to certain components of the HTAP system 110. The architecture of the HTAP system 110 may include a smart proxy that dispatches queries to the OLTP and OLAP subsystems based on the nature of the queries (and therefore can hide the internal details to the users/clients). Users/clients may be able to utilize the HTAP system 110 with a single unified interface. For example, users/clients may be able to utilize the HTAP system 110 with an interface of a client device 104. The architecture may support various kinds of APIs (e.g., ANSI SQL, JDBC, ODBC, etc.) based on user requirements.

The architecture of the HTAP system 110 may be able to handle a large scale of data. This is a result of the fact that the compute and storage components in the HTAP system 110 may be decoupled. A decoupled storage system that is able to persist large amounts of data us utilized, as it is not assumed that data will be able to fit in memory. Computation resources and storage resources in the HTAP system 110 may also be scaled out, and are therefore capable of handling large amounts of data and large scale (OLTP and OLAP) workloads with flexibility.

The architecture of the HTAP system 110 may be capable of effective and real-time data processing. DML queries may be handled effectively by the OLTP engine and effectively written to the underlying storage in row format. The architecture of the HTAP system 110 may include a OLAP query engine that has the ability of distributed query processing (high parallelism, better resource utilization) to effectively handle complex OLAP queries, including joins, aggregates, etc. Effective and real-time processing is empowered by the fact that interference between OLTP and OLAP workloads is minimized, as the architecture of the HTAP system 110 facilities the storage of distinct copies of data on both the OLTP and OLAP sides. The OLTP and OLAP data formats may be separately optimized to fit their workloads. There may be a single source of data change through the HTAP system 110 (from the OLTP side), simplifying the consistency model and concurrency handling across the OLTP and OLAP components.

The architecture of the HTAP system 110 may provide fresh/real-time data changes for OLAP queries. Logical logs of DMLs may be immediately propagated from the OLTP component to the OLAP component upon commit. These logs may be dispatched to distributed partitions and may be continuously applied to in-memory Delta Stores via in-memory operations, which are usually very fast. Data changes carried by logical logs may be immediately available for OLAP queries upon being applied to in-memory Delta Stores. A unified version control across the HTAP system 110 is utilized by the architecture of the HTAP system 110 so that strong data consistency is guaranteed.

The OLTP component of the HTAP system 110 may support snapshot isolation and other (weaker) consistency models as most of transactional OLTP database engines.

Figure 2:
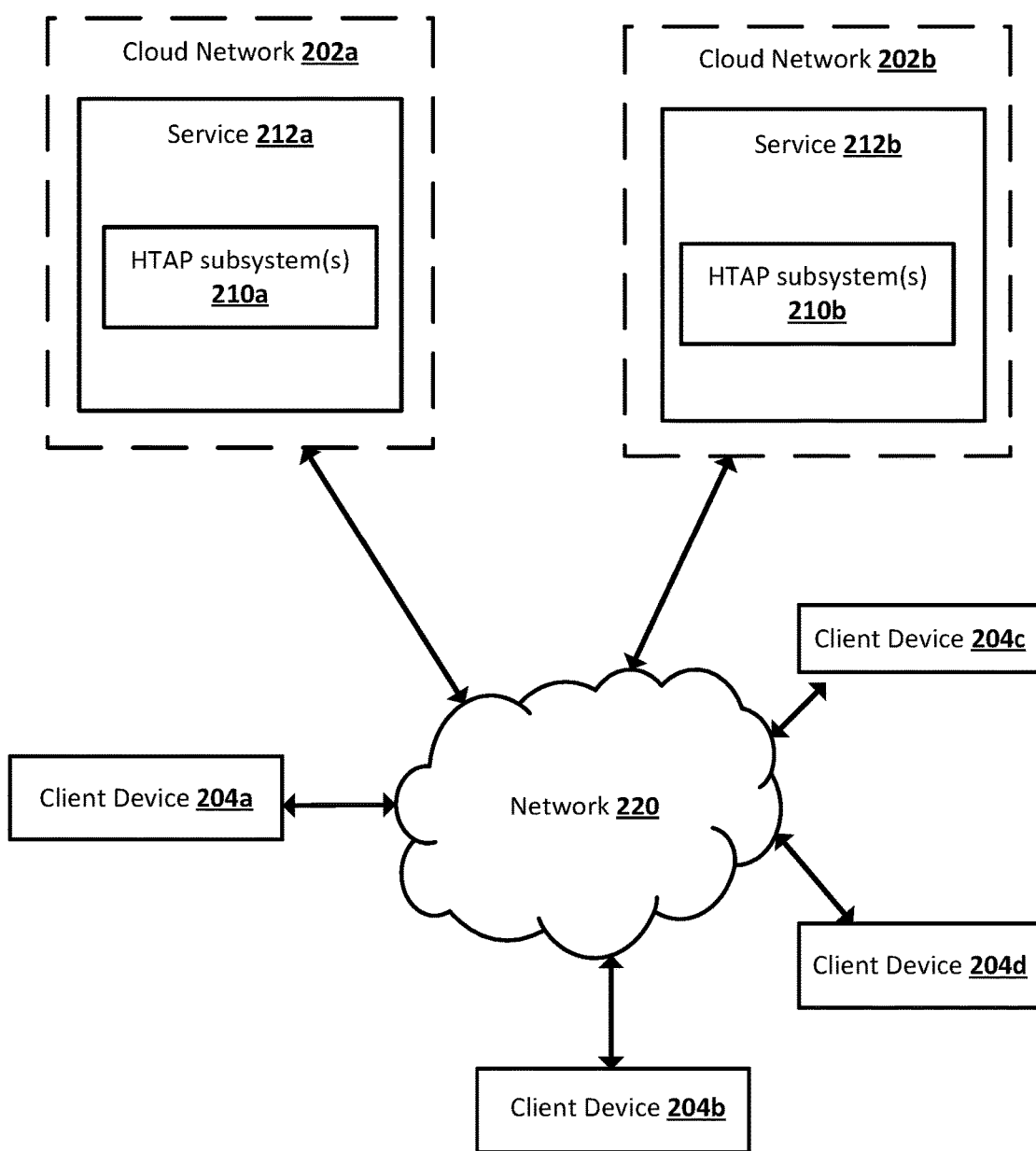
FIG. 2 shows an example system including more than one cloud service.

While the system 100 of FIG. 1 illustrates the HTAP system 110 as being provided by a single cloud network 102, the various components/subsystems of the HTAP system 110 may instead be provided by a plurality of different cloud networks. FIG. 2 illustrates an example system 200 that includes an HTAP system having components/subsystems across a plurality of cloud networks. The system 200 may comprise cloud networks 202a-b and a plurality of client devices 204a-d. The cloud networks 202a-b and the plurality of client devices 204a-d may communicate with each other via one or more networks 220.

Each of the cloud networks 202a-b may resemble the cloud network 102 described above in FIG. 1. Each of the cloud networks 202a-b may be located at a data center, such as a single premise, or be distributed throughout different geographic locations (e.g., at several premises). The cloud networks 202a-b may provide service(s) via the one or more networks 220. The cloud networks 202a-b comprise a variety of network devices, such as routers, switches, multiplexers, hubs, modems, bridges, repeaters, firewalls, proxy devices, and/or the like. The cloud networks 202a-b may comprise physical links, such as coaxial cable links, twisted pair cable links, fiber optic links, a combination thereof, and/or the like. The cloud networks 202a-b may comprise wireless links, such as cellular links, satellite links, Wi-Fi links and/or the like.

Each of the cloud networks 202a-b may comprise a plurality of computing nodes that host a variety of services. In an embodiment, the nodes associated with the cloud network 202a host a service 212a and the nodes associated with the cloud network 202b host a service 212b. The services 212a-b may comprise any type of service, such as the content streaming service described above with respect to FIG. 1.

The plurality of client devices 204 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access at least one of the cloud networks 202a-b. The plurality of client devices 104 may travel to a variety of locations and use different networks to access the cloud networks 202a-b.

In an embodiment, each of the services 212a-b comprise one or more components/subsystems of an HTAP system (e.g., the HTAP system 110). The HTAP system 110 may comprise a plurality of different components (e.g., subsystems). For example, the HTAP system may comprise one or more of a transactional OLTP engine, an analytic OLAP engine, an underlying decoupled storage, a metadata service, and/or a smart proxy. The service 212a may comprise one or more of (but not all of) the components of the HTAP system. The service 212b may comprise the remainder of the components of the HTAP system. While two cloud networks and their respective services are shown in FIG. 2, it should be appreciated that any number of cloud networks/services may be utilized to implement the herein described HTAP system.

Figure 3A:
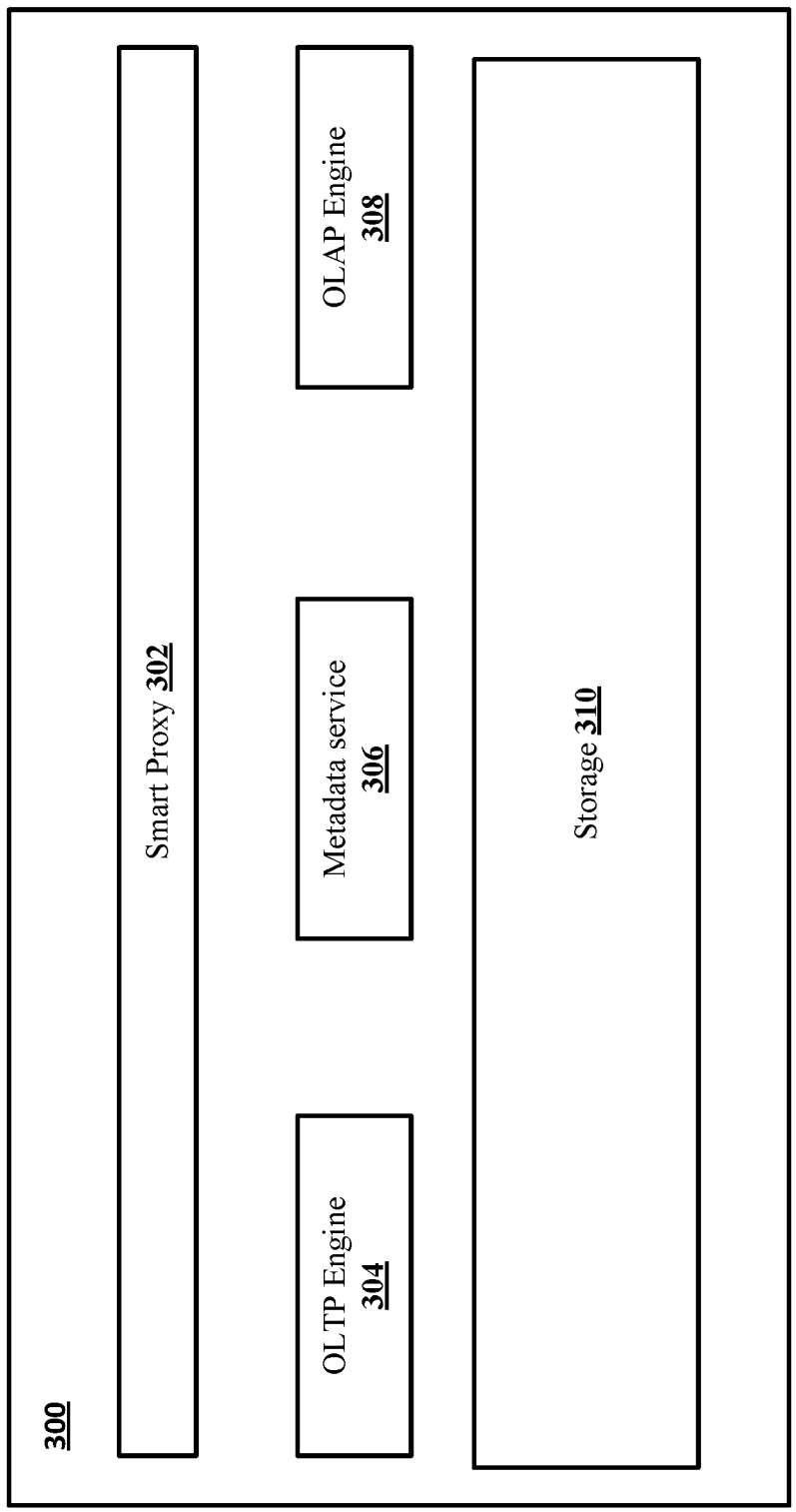
FIG. 3A shows an example system for hybrid transactional and analytical processing.

FIG. 3a illustrates an exemplary architecture 300 for an HTAP system (e.g., the HTAP system 110). The architecture 300 comprises a plurality of different components (e.g., subsystems). The subsystems include a transactional OLTP engine 304, an analytic OLAP engine 308, an underlying decoupled storage 310, a metadata service 306, and/or a proxy 302.

The OLTP engine 304 may be any OLTP engine that is configured to handle OLTP transactions. OLTP transactions may include DML and point look up queries. The OLTP engine 304 may adopt a model that separates the compute engine from the underlying shared/cloud storage (e.g., AWS Aurora-like). The OLTP engine 304 may provide a variety of functionalities, including but not limited to ACID transactional support, row storage, write-ahead logs (WAL) and log replication. An exemplary architecture for the OLTP engine 304 is described below in more detail with regard to FIG. 4.

The OLAP engine 308 may be any OLAP engine that is configured to handle analytic queries, such as complex analytics queries. For example, the OLAP engine 308 may be an established open-source query engine (e.g., FlinkSQL). An exemplary architecture for the OLAP engine 308 is described below in more detail with regard to FIG. 5.

The storage subsystem 310 may be decoupled from the OLTP engine 304 and the OLAP engine 308. The storage 310 may persist user data in a first format (e.g., row format) to be consumed by the OLTP engine 304 and persist the same user data in a second format (e.g., hybrid row+column format) to be consumed by the OLAP engine 308. This may significantly reduce the interference between the OLAP and OLTP workloads. An exemplary architecture for the storage subsystem 310 is described below in more detail with regard to FIG. 6.

The metadata service 306 may be configured to extract metadata from events (e.g. DDLs) generated by certain resources (e.g. user input through the OLTP engine 308), generate metadata versions and align them with the order of DMLs, make them globally available and persist them. The metadata service 306 may generate replicas of the metadata versions for high availability. The metadata service 306 may extract metadata from DDLs received by the OLTP engine (with versions aligned by the same LSN system used for DMLs), persisted into a dedicated database and pushed to/pulled by FlinkSQL and AP storage servers.

The proxy 302 may be configured to connect clients to the heterogeneous OLTP engine 304 and/or the OLAP engine 308 though a common proxy layer. The proxy 302 may provide a single unified API (default: ANSL SQL plus some common OLAP extensions) to users/clients, i.e., the underlying system details are transparent to the clients if they connected through the proxy. Various kinds of APIs (e.g., ANSI SQL, JDBC, ODBC, etc.) may be utilized, based on user requirements. Utilizing a single unified API may reduce user efforts in using the system. The proxy 302 may have the ability to automatically dispatch different client requests/queries to different engines (e.g., the OLTP engine 304 or the OLAP engine 308) based on the nature of the request. For example, a complex OLAP query will be directed to the OLAP engine 308, while DMLs, DDLs and point-lookups queries would likely be directed to the OLTP engine 304.

The components of the architecture 300 may be modularized and configured to be decoupled from each other. As a result, the components can be easily changed without the hassle of modifying the whole architecture. The modularized design also makes scaling out of each component much easier. For example, one or more of the OLTP engine 304, the OLAP engine 308, the storage 310, the metadata service 306, and/or the proxy 302 may be decoupled from the remainder of the components and replaced with a substitute component (e.g., a similar established module or subsystem). For example, the current OLTP engine 304 may be MySQL, but it can be easily swapped to any other established OLTP engine, such as PostgreSQL. Similarly, the current OLAP engine 308 may be FlinkSQL, but it can be easily switched to any other established OLAP engine such as Presto or Spark SQL. The storage 310, the metadata service 306, and/or the proxy 302 may similarly be replaced with a substitute component.

Figure 3B:
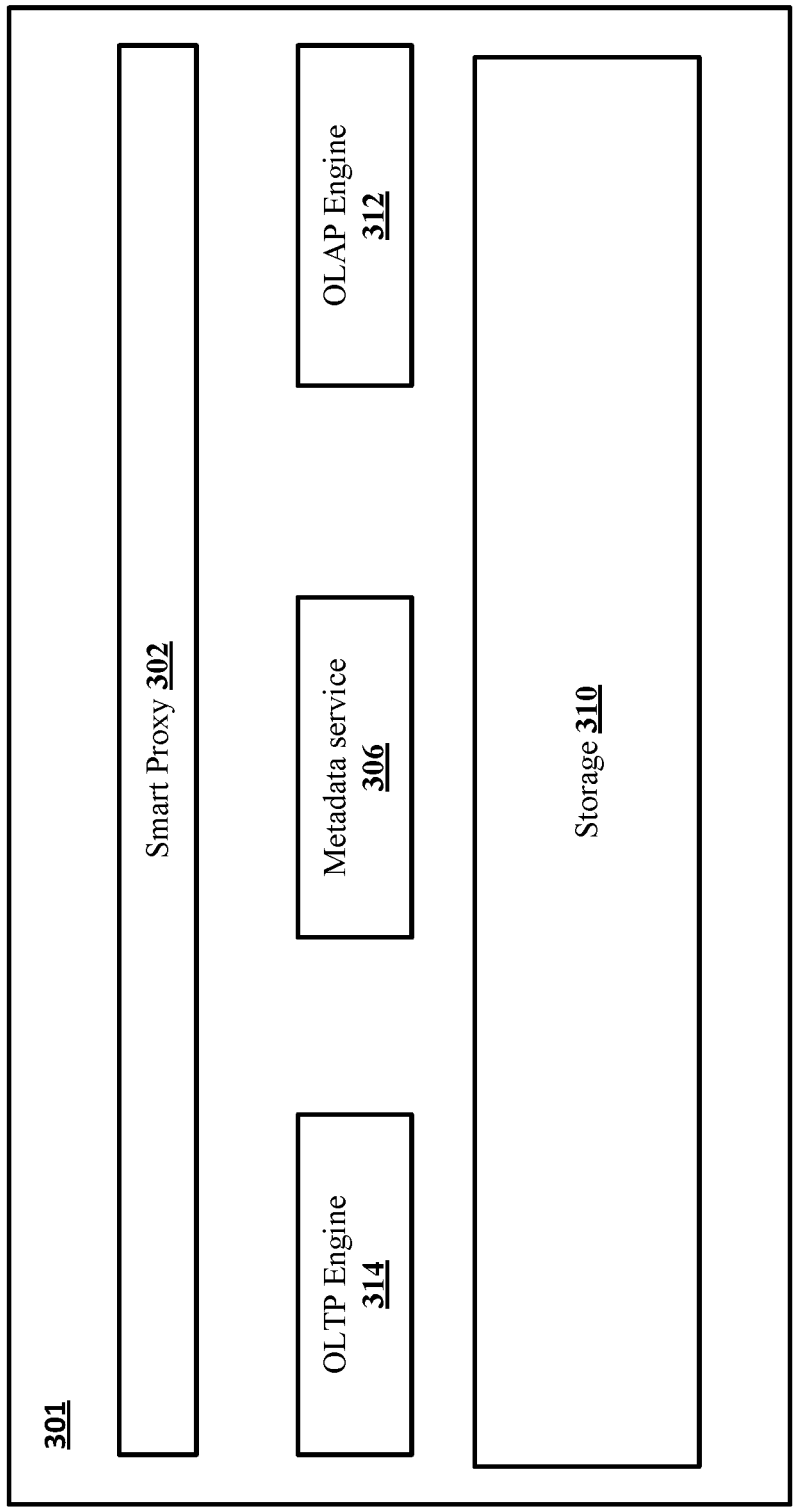
FIG. 3B shows another example system for hybrid transactional and analytical processing.

FIG. 3b illustrates an exemplary architecture 301 for an HTAP system (e.g., the HTAP system 110) after one or more components of the architecture 300 were decoupled from the remainder of the components and replaced with a substitute component. The architecture 301 comprises a plurality of different components (e.g., subsystems). The subsystems include a transactional OLTP engine 314, an analytic OLAP engine 312, an underlying decoupled storage 310, a metadata service 306, and/or a proxy 302. The OLTP engine 304 of FIG. 3a was replaced with the OLTP engine 314. Similarly, the OLAP engine 308 of FIG. 3a was replaced with the OLAP engine 312. While the storage 310, the metadata service 306, and the proxy 302 remained the same, in other embodiments, each of these components may similarly be replaced with a substitute component.

Figure 4:
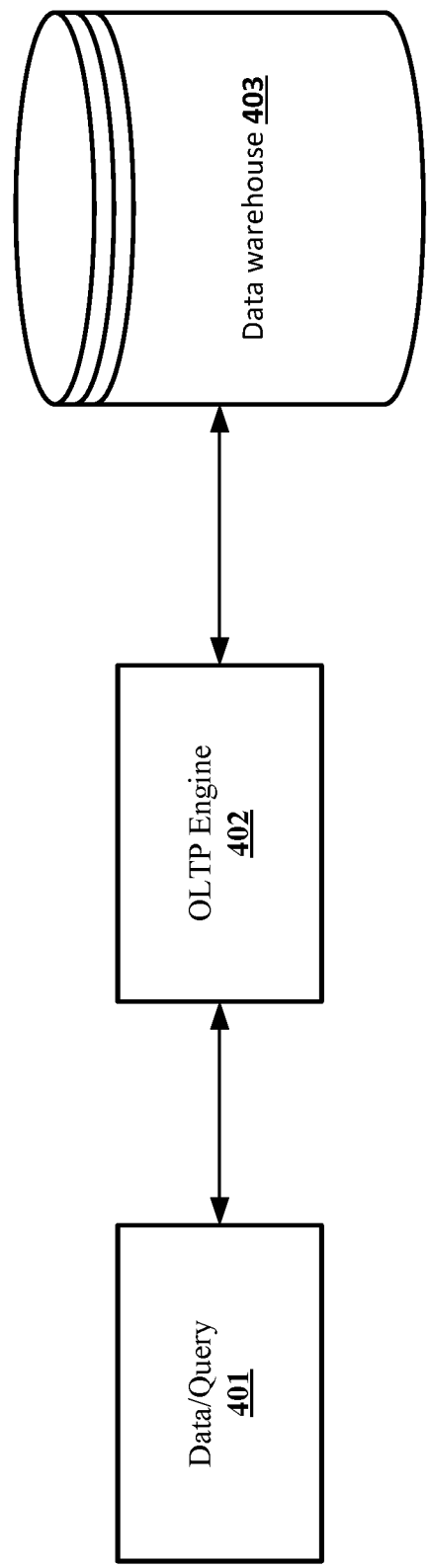
FIG. 4 shows an example system for online transactional processing.

FIG. 4 shows an example system 400 for online transaction processing. The OLTP system 400 comprises an OLTP engine 402 that receives data or query 401 from client devices, e.g., the client devices 104a-104d. The OLTP engine 402 may utilize a model that separates the compute engine from the underlying shared/cloud storage (AWS Aurora-like). The OLTP engine 402 may provide functionalities such as ACID transactional support, row storage, write-ahead logs (WAL) and log replication. The OLTP engine 402, for example, may capture data in real-time or near real-time. The OLTP system 400 comprises a data warehouse 403. The data warehouse 403 may store the data captured by the OLTP engine 402. The data warehouse 403 may be accessible by an OLAP engine so that the OLAP engine may process the stored data in response to analytic queries. The OLTP engine 402 may be configured to be coupled to and/or decoupled from a larger HTAP system (e.g., the HTAP system 110).

The OLTP engine 402 may be configured to process at least some of the received user data in a particular format (e.g., row-based format). For example, upon receiving an OLTP query, the OLTP engine 402 may be configured to process at least some of the received user data in response to the query. An OLTP query may include, by way of example and without limitation, a query to retrieve a particular data item, query to filter the received data to look for a particular data item/description of a data item, and/or a query to filter the received data to identify a particular subset of the received data. For example, the queries may be DML queries and/or point look up queries.

Figure 5:
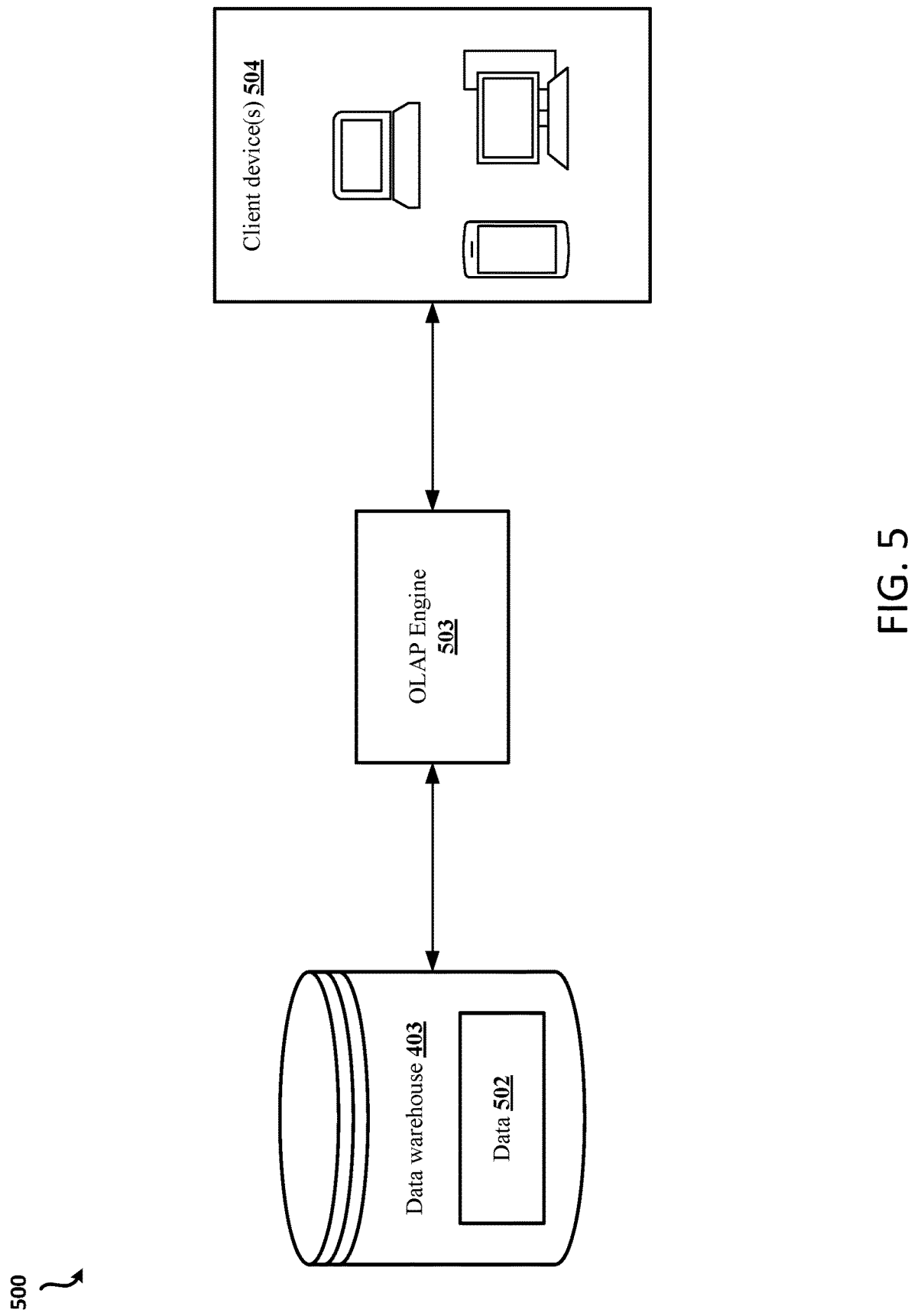
FIG. 5 shows an example system for online analytical processing.

FIG. 5 shows an example system 500 for online analytical processing. The OLAP system 500 comprises an OLAP engine 503 that receives data captured by an OLTP system. For example, the OLAP engine 503 may retrieve data stored in the data warehouse 403 described above with respect to FIG. 4. The data received by the OLAP engine 503 may be in a particular format (e.g., a hybrid row+column format) that is readable by the OLAP engine 503. The OLAP engine 503 may perform analysis on at least one portion of the data in the particular format in response to receiving an OLAP query.

For example, the OLAP engine 503 may perform an analytical operation on at least one portion of the data. OLAP consists of three basic analytical operations: consolidation (roll-up), drill-down, and slicing and dicing. Consolidation involves the aggregation of data that can be accumulated and computed in one or more dimensions. For example, all sales offices are rolled up to the sales department or sales division to anticipate sales trends. By contrast, the drill-down is a technique that allows users to navigate through the details. For instance, users can view the sales by individual products that make up a region's sales. Slicing and dicing is a feature whereby users can take out (slicing) a specific set of data of the OLAP cube and view (dicing) the slices from different viewpoints. These viewpoints are sometimes called dimensions (such as looking at the same sales by salesperson, or by date, or by customer, or by product, or by region, etc.)

The results of the processing may be sent or forwarded to client devices 504. The OLAP engine 503 may be any OLAP engine that is capable of handling complex analytic queries effectively, such as an established open-source query engine (e.g., FlinkSQL). The OLAP engine 503 may be configured to be coupled to and/or decoupled from a larger HTAP system (e.g., the HTAP system 110).

Figure 6:
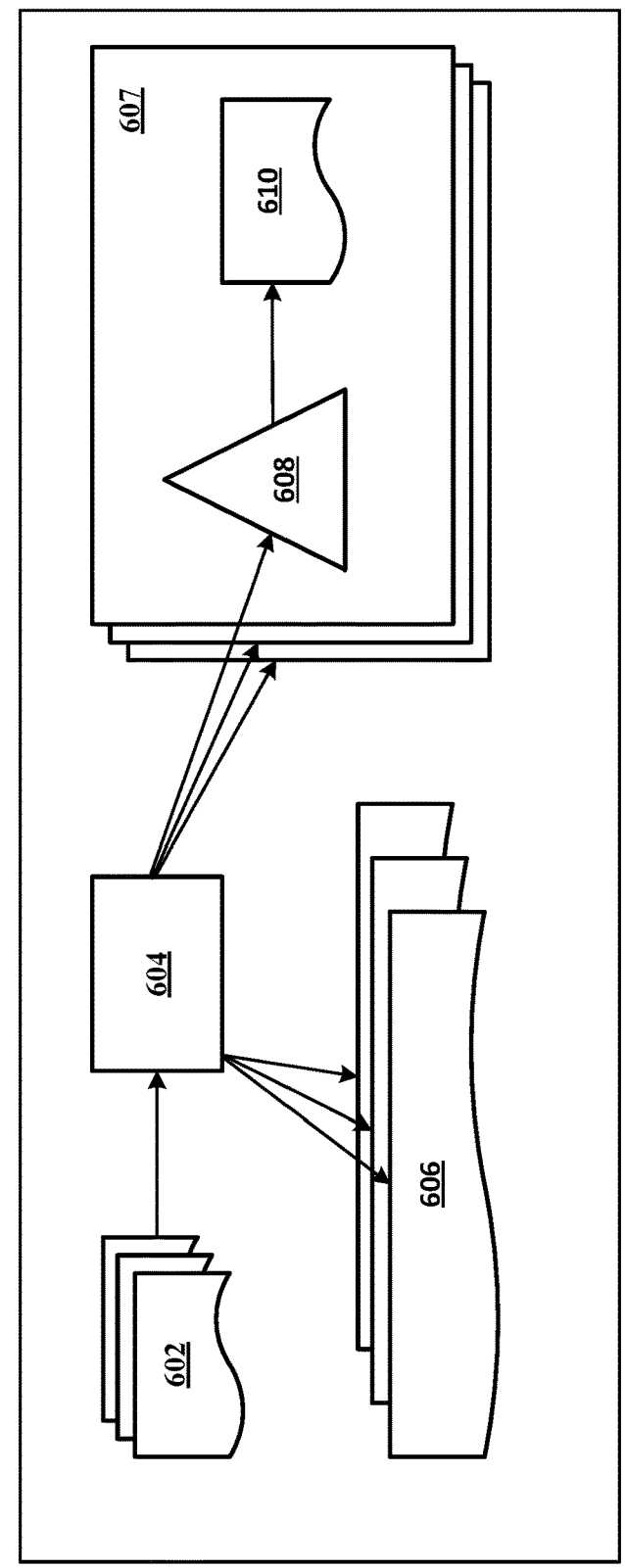
FIG. 6 shows an example system for data storage.

FIG. 6 shows an example system 600 for data storage in accordance with the present disclosure. The data storage system 600 may persist user data in one format (e.g., row format) to be consumed by an OLTP engine, while persisting the same user data in a different format (e.g., hybrid row+column format) to be consumed by an OLAP engine. This may significantly reduce the interference between the OLAP and OLTP workloads. A plurality of data replicas (e.g., three data replicas) may be kept for both formats of data for high availability.

The data storage system 600 may function as a unified storage layer. However, the architecture of the data storage system 600, may be divided into two parts: the TP part and the AP part. Transactional DML and DDL received by the OLTP engine may be presented as physical/redo logs (with the information of underlying storage) and logical logs in a log store 602. These logs may be persisted in the TP part of the storage. The physical logs may then be replicated and distributed by a log distributor 604 to other storages and replayed to construct data pages. Data in the pages may be organized in row format and stored in a row data store 606. The data stored in the row data store 606 may be used by the OLTP engine for simple queries including point-lookup queries. The logical logs may also be replicated and distributed by the log distributor 604 to the AP part of the storage.

Each user table in the AP part of storage may be partitioned based on partitioning scheme defined on table creation. Each partition 607 may be resident in a physical storage node (e.g., server) and several replicas of the data may be maintained for high availability. Each partition 607 may be further divided into an in-memory delta store 608 and an on-disk base store 610. Logical logs (such as MySQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates.

Logical logs arrived at each AP storage nodes may be sorted, persisted, and then applied in order into the in-memory delta store 608 of each partition 607. Delta store 608 may store data in row format that is ordered by their log serial number (LSN, a serial number/version that indicates the order of the data operations). Data inside delta store 608 may be flushed to base store 610 in regular bases, for example, when its size grows over some predefined threshold or after some fixed time interval. After the flush, memory occupied by the flushed data may be garbage collected.

Data in base store 610 may be organized in columnar format for better performance of analytic workloads and persisted in local file systems (with current implementation. However, it should be appreciated that the architecture works with any underlying storage method. Data in base store 610 may not be able to be updated in-place, so a delete bitmap that marks the rows that are deleted may be maintained. With more and more deletions and overlapping flushed data units, compacting, and rearranging the data inside may benefit storage and potentially query performance, thus AP data units and clean up redundant data may be compacted on a regular basis. Files in base store 610 may be versioned, which is the largest LSNs in a file when it is flushed. LSNs may not be kept in the base store 610, which may result in all files in the base store 610 having the same version (i.e., the last flush LSN). This may provide many advantages. For example, it may save storage space, make delete more efficient by using the delete bitmap, and make scan faster without the need to compare with LSNs.

Figure 7:
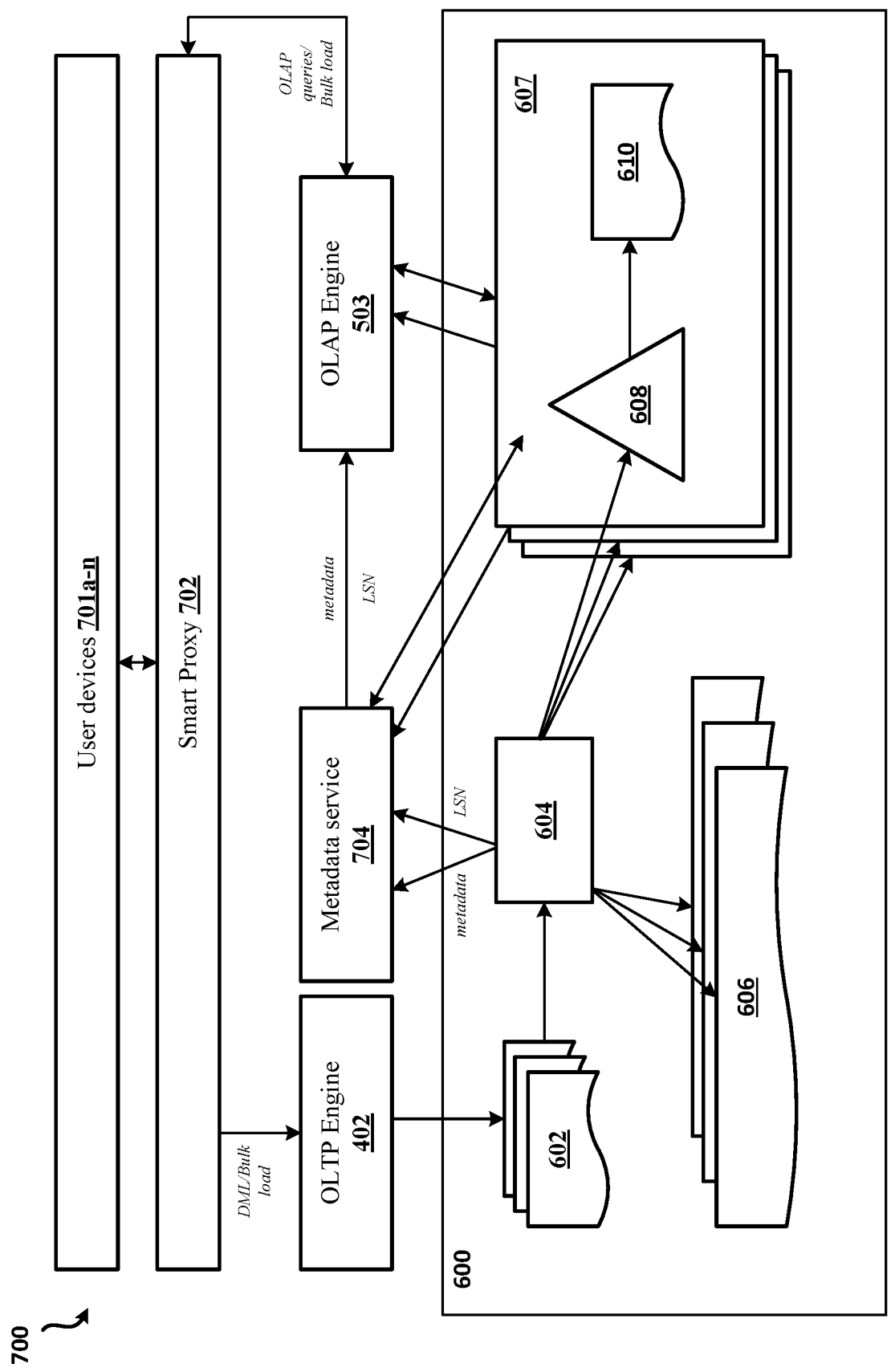
FIG. 7 shows example system for hybrid transactional and analytical processing.

FIG. 7 shows an exemplary architecture 700 for a HTAP system in accordance with the present disclosure. The architecture 700 may be a more detailed view of the HTAP system architectures 300, 301 described above with respect to FIGS. 3*a*-3*b*. The architecture 700) comprises a plurality of different components (e.g., subsystems). The subsystems include the OLTP engine 402 described above with reference to FIG. 4, the OLAP engine 503 described above with reference to FIG. 5, the data storage system 600 described above with reference to FIG. 6, a metadata service 704, and/or a proxy 702.

As described above, the OLTP engine 402 may receive user data, such as from the user devices 701*a*-*n*. The OLTP engine 402 may utilize a model that separates the compute engine from the underlying shared/cloud storage (AWS Aurora-like). The OLTP engine 402 may provide functionalities such as ACID transactional support, row storage, write-ahead logs (WAL) and log replication. The OLTP engine 402, for example, may capture the user data in real-time or near real-time. The OLTP system 400 comprises a data warehouse 403. The data warehouse 403 may store the data captured by the OLTP engine 402. The data warehouse 403 may be accessible by an OLAP engine so that the OLAP engine may process the stored data in response to analytic queries.

The OLTP engine 402 may be configured to process at least some of the received user data in a particular format (e.g., row-based format). For example, upon receiving an OLTP query, the OLTP engine 402 may be configured to process at least some of the received user data in response to the query. An OLTP query may include, by way of example and without limitation, a query to retrieve a particular data item, query to filter the received data to look for a particular data item/description of a data item, and/or a query to filter the received data to identify a particular subset of the received data. For example, the queries may be DML queries and/or point look up queries.

The OLTP engine 402 may be configured to be coupled to and/or decoupled from the larger HTAP system 700. If the OLTP engine 402 is decoupled from the larger HTAP system 700, the OLTP engine 402 may be replaced with a substitute OLTP engine (e.g., a similar established OLTP engine). For example, the OLTP engine 402 may be MySQL, but it can be easily swapped to any other established OLTP engine, such as PostgreSQL.

The user devices 701a-n may comprise any type of computing device, such as a mobile device, a tablet device, laptop, a desktop computer, a smart television, or other smart device (e.g., smart watch, smart speaker, smart glasses, smart helmet), a gaming device, a set top box, digital streaming device, robot, and/or the like. The user devices 701a-n may be associated with one or more users. A single user may use one or more of the user devices 701a-n to access a cloud network that comprises the OLTP engine 402. The user devices 701a-n may travel to a variety of locations and use different networks to access the cloud network comprising the OLTP engine 402.

As also described above, the OLAP engine 503 may receive data captured by an OLTP engine, such as the OLTP engine 402. For example, the OLAP engine 503 may retrieve data stored in the data warehouse 403. The data received by the OLAP engine 503 may be in a particular format (e.g., a hybrid row+column format) that is readable by the OLAP engine 503. The OLAP engine 503 may perform analysis on at least one portion of the data in the particular format in response to receiving an OLAP query.

For example, the OLAP engine 503 may perform an analytical operation on at least one portion of the data. OLAP consists of three basic analytical operations: consolidation (roll-up), drill-down, and slicing and dicing. Consolidation involves the aggregation of data that can be accumulated and computed in one or more dimensions. For example, all sales offices are rolled up to the sales department or sales division to anticipate sales trends. By contrast, the drill-down is a technique that allows users to navigate through the details. For instance, users can view the sales by individual products that make up a region's sales. Slicing and dicing is a feature whereby users can take out (slicing) a specific set of data of the OLAP cube and view (dicing) the slices from different viewpoints. These viewpoints are sometimes called dimensions (such as looking at the same sales by salesperson, or by date, or by customer, or by product, or by region, etc.). The results of the processing may be sent or forwarded to client devices 504.

The OLAP engine 503 may be any OLAP engine that is capable of handling complex analytic queries effectively, such as an established open-source query engine (e.g., FlinkSQL). The OLAP engine 503 may be configured to be coupled to and/or decoupled from the larger HTAP system 700. If the OLAP engine 503 is decoupled from the larger HTAP system 700, the OLAP engine 503 may be replaced with a substitute OLAP engine (e.g., a similar established OLAP engine). For example, the OLAP engine 503 may be FlinkSQL, but it can be easily swapped to any other established OLAP engine, such as Presto or Spark SQL.

The storage subsystem 600 may be decoupled from the OLTP engine 402 and the OLAP engine 503. As also described above, the data storage system 600 may persist user data in one format (e.g., row format) to be consumed by an OLTP engine, such as the OLTP engine 402, while persisting the same user data in a different format (e.g., hybrid row+column format) to be consumed by an OLAP engine, such as the OLAP engine 503. This may significantly reduce the interference between the OLAP and OLTP workloads. A plurality of data replicas (e.g., three data replicas) may be kept for both formats of data for high availability.

The data storage system 600 may function as a unified storage layer. However, the architecture of the data storage system 600, may be divided into two parts: the TP part and the AP part. Transactional DML and DDL received by the OLTP engine may be presented as physical/redo logs (with the information of underlying storage) and logical logs in a log store 602. These logs may be persisted in the TP part of the storage. The physical logs may then be replicated and distributed by a log distributor 604 to other storages and replayed to construct data pages. Data in the pages may be organized in row format and stored in a row data store 606. The data stored in the row data store 606 may be used by the OLTP engine for simple queries including point-lookup queries. The logical logs may also be replicated and distributed by the log distributor 604 to the AP part of the storage.

Each user table in the AP part of storage may be partitioned based on partitioning scheme defined on table creation. Each partition 607 may be resident in a physical storage node (e.g., server) and several replicas of the data may be maintained for high availability. Each partition 607 may be further divided into an in-memory delta store 608 and an on-disk base store 610. Logical logs (such as MySQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates.

Logical logs arrived at each AP storage nodes may be sorted, persisted, and then applied in order into the in-memory delta store 608 of each partition 607. Delta store 608 may store data in row format that is ordered by their log serial number (LSN, a serial number/version that indicates the order of the data operations). Data inside delta store 608 may be flushed to base store 610 in regular bases, for example, when its size grows over some predefined threshold or after some fixed time interval. After the flush, memory occupied by the flushed data may be garbage collected.

Data in base store 610 may be organized in columnar format for better performance of analytic workloads and persisted in local file systems (with current implementation. However, it should be appreciated that the architecture works with any underlying storage method. Data in base store 610 may not be able to be updated in-place, so a delete bitmap that marks the rows that are deleted may be maintained. With more and more deletions and overlapping flushed data units, compacting, and rearranging the data inside may benefit storage and potentially query performance, thus AP data units and clean up redundant data may be compacted on a regular basis. Files in base store 610 may be versioned, which is the largest LSNs in a file when it is flushed. LSNs may not be kept in the base store 610, which may result in all files in the base store 610 having the same version (i.e., the last flush LSN). This may provide many advantages. For example, it may save storage space, make delete more efficient by using the delete bitmap, and make scan faster without the need to compare with LSNs.

The storage subsystem 600 may be configured to be coupled to and/or decoupled from the larger HTAP system 700 as shown FIG. 7. If the storage subsystem 600 is decoupled from the larger HTAP system 700, the storage subsystem 600 may be replaced with a substitute storage subsystem (e.g., a similar established storage subsystem).

The metadata service 704 may be configured to align the metadata of the OLTP engine 402 and the OLAP engine 503. The metadata service 704 may extract metadata from events (e.g., DDLs) generated by certain resources (e.g., user input through the OLTP engine 308), generate metadata versions and align them with the order of DMLs, make them globally available and persist them. The metadata service 306 may generate replicas of the metadata versions for high availability. The metadata service 306 may extract metadata from DDLs received by the OLTP engine (with versions aligned by the same LSN system used for DMLs), persisted into a dedicated database and pushed to/pulled by FlinkSQL and AP storage servers.

The metadata service 704 may be configured to be coupled to and/or decoupled from the larger HTAP system 700. If the metadata service 704 is decoupled from the larger HTAP system 700, the metadata service 704 may be replaced with a substitute metadata service (e.g., a similar established metadata service).

The proxy 702 may be configured to connect user devices 701*a-n* to the OLTP engine 402 and/or the OLAP engine 503 though a common proxy layer. The proxy 702 may be a smart proxy. The proxy 702 may provide a single unified API (default: ANSL SQL plus some common OLAP extensions) to users/clients, i.e., the underlying system details are transparent to the clients if they connected through the proxy. Various kinds of APIs (e.g., ANSI SQL, JDBC, ODBC, etc.) may be utilized, based on user requirements. Utilizing a single unified API may reduce user efforts in using the system. The proxy 702 may have the ability to automatically dispatch different client requests/queries to different engines (e.g., the OLTP engine 402 or the OLAP engine 503) based on the nature of the request. For example, a complex OLAP query will be directed to the OLAP engine 503, while DMLs, DDLs and point-lookups queries will be directed to the OLTP engine 402.

The proxy 702 may be configured to be coupled to and/or decoupled from the larger HTAP system 700. If the proxy 702 is decoupled from the larger HTAP system 700, the proxy 702 may be replaced with a substitute common proxy (e.g., a similar established proxy).

Figure 8:
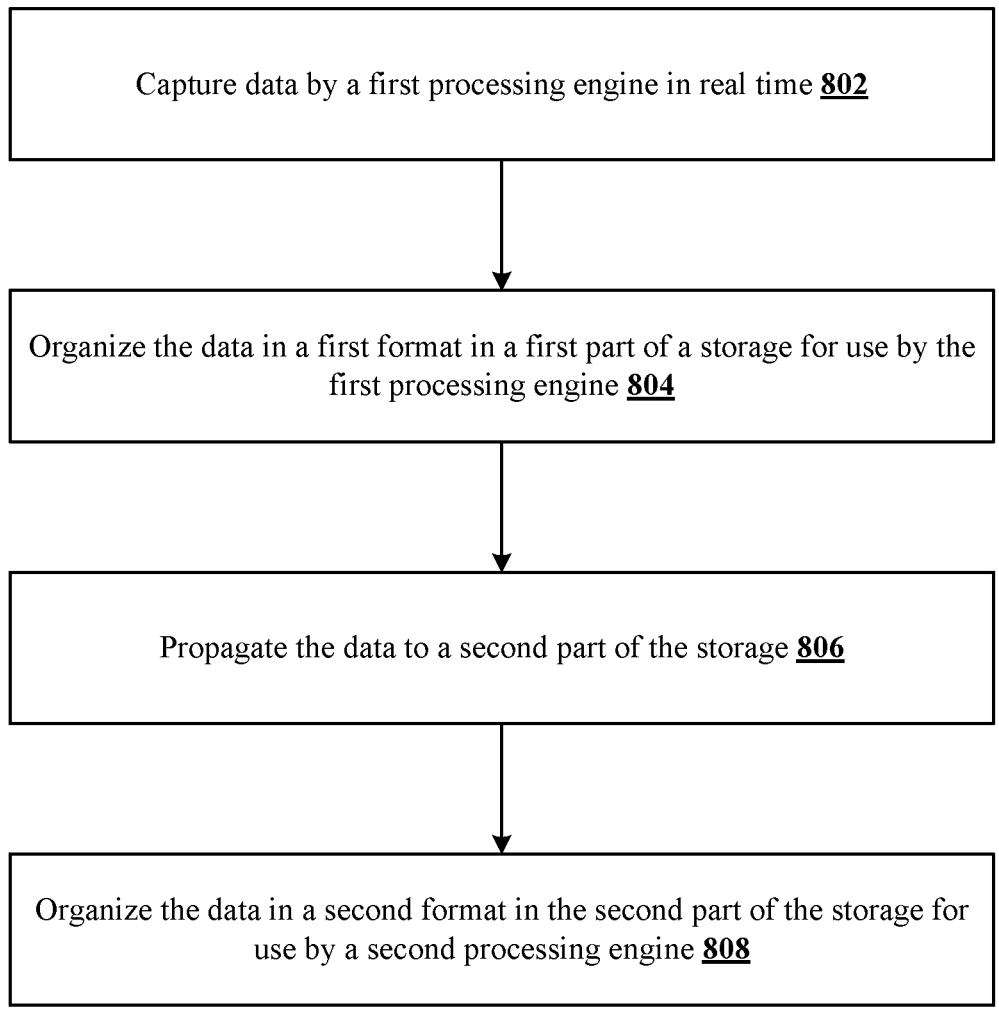
FIG. 8 shows an example process for performing hybrid transactional and analytical processing.

FIG. 8 illustrates an example process 800 that may be performed by a HTAP system, e.g., the HTAP system 700 as shown in FIG. 7. The HTAP system may perform the process 800 to receive and/or organize user data in a manner that it able to be utilized by an OLTP subsystem and an OLAP subsystem. Although depicted as a sequence of operations in FIG. 8, those of ordinary skill in the art will appreciate that various embodiments may add, remove, reorder, or modify the depicted operations.

At 802, data may be captured by a first computing system in real-time (or near real-time). The first computing system may be, for example, an OLTP engine (e.g., OLTP engine 402). Since OLTP workloads inherently perform better with row-based data format and OLAP workloads prefer columnar data format, using one format for both workloads means that performance of the HTAP system is compromised.

To prevent this compromise of performance, user data may be stored in different formats for the OLTP engine and the OLAP engine. For example, user data may be kept in a first format (e.g., in row format) for the OLTP engine and a second format (e.g., a columnar format) for the OLAP engine for efficient query processing. At 804, the data may be organized in a first format in a first part of a storage subsystem for use by the first processing engine.

To organize the data in a first format in a first part of the storage subsystem, transactional DML and DDL received by the OLTP engine may be presented as physical/redo logs (with the information of underlying storage) and logical logs in a log store (e.g., log store 602). These logs may be persisted in the first part (e.g., TP part) of the storage. The physical logs may then be replicated and distributed by a log distributor (e.g., log distributor 604) to other storages and replayed to construct data pages. Data in the pages may be organized in row format and stored in a row data store (e.g., row data store 606). The data stored in the row data store may be used by the OLTP engine for simple queries including point-lookup queries.

The logical logs may also be replicated and distributed by the log distributor to a second part (e.g., AP part) of the storage subsystem. At 806, the data may be propagated to a second part of the storage subsystem. Each user table in the second part of the storage subsystem may be partitioned based on partitioning scheme defined on table creation. Each partition (e.g. partitions 607) may be resident in a physical storage node (e.g., server) and several replicas of the data may be maintained for high availability. Each partition may be further divided into an in-memory delta store (e.g., delta store 608) and an on-disk base store (e.g., base store 610). Logical logs (such as MySQL Binary Logs) for committed DML transactions may be continuously dispatched from the OLTP engine to user table partitions on each AP storage nodes. As an example, an update may be modeled with a delete followed by an insert. As a result, in the logical logs, there may be only inserts and deletes, but no updates.

At 808, the data may be organized in a second format in the second part of the storage subsystem for use by a second processing engine (e.g., OLAP subsystem). Logical logs arrived at each AP storage nodes may be sorted, persisted, and then applied in order into the in-memory delta store of each partition. Delta store may store data in row format that is ordered by their log serial number (LSN, a serial number/version that indicates the order of the data operations). Data inside delta store may be flushed to base store in regular bases, for example, when its size grows over some predefined threshold or after some fixed time interval. After the flush, memory occupied by the flushed data may be garbage collected.

Data in base store may be organized in columnar format for better performance of analytic workloads and persisted in local file systems (with current implementation. However, it should be appreciated that the architecture works with any underlying storage method. Data in base store may not be able to be updated in-place, so a delete bitmap that marks the rows that are deleted may be maintained. With more and more deletions and overlapping flushed data units, compacting, and rearranging the data inside may benefit storage and potentially query performance, thus AP data units and clean up redundant data may be compacted on a regular basis. Files in base store may be versioned, which is the largest LSNs in a file when it is flushed. LSNs may not be kept in the base store, which may result in all files in the base store having the same version (i.e., the last flush LSN). This may provide many advantages. For example, it may save storage space, make delete more efficient by using the delete bitmap, and make scan faster without the need to compare with LSNs.

Figure 9:
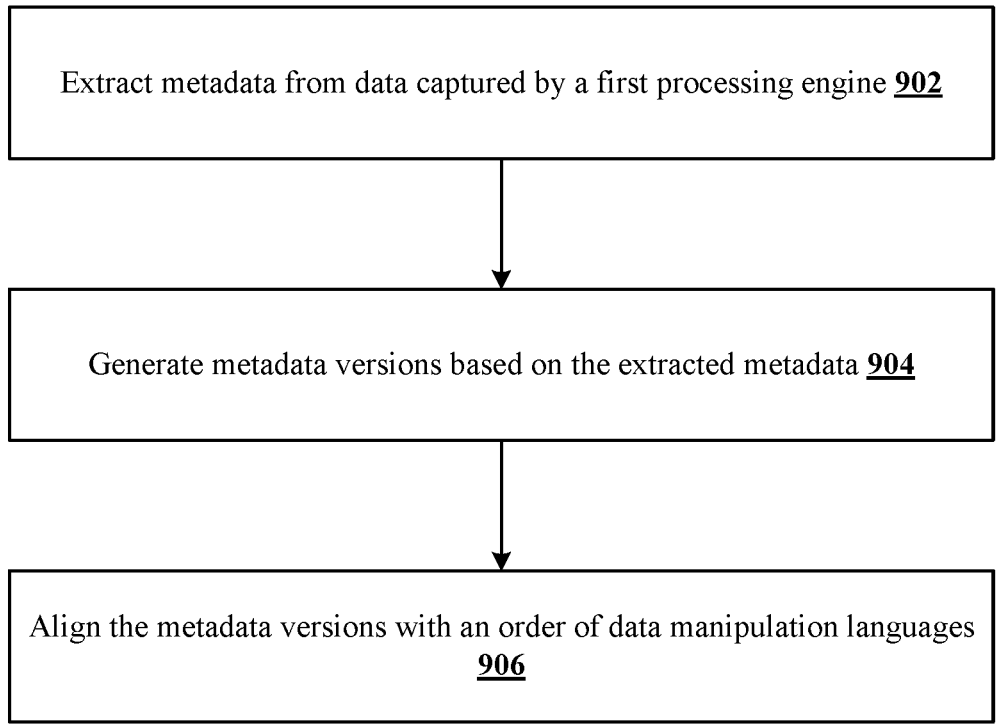
FIG. 9 shows an example process for performing centralized metadata service.

FIG. 9 illustrates an example process 900 that may be performed by a centralized metadata service of a HTAP system. For example, the process 900 may be performed by the metadata service 704 of the HTAP system 700 as shown in FIG. 7. The HTAP system may perform the process 900 to align metadata for integrating an OLTP subsystem and an OLAP subsystem in the HTAP system. Although depicted as a sequence of operations in FIG. 9, those of ordinary skill in the art will appreciate that various embodiments may add, remove, reorder, or modify the depicted operations.

At 902, metadata may be extracted from data captured by a first processing engine (e.g., an OLTP engine). Metadata may be extracted from events (e.g., DDLs) generated by certain resources (e.g., user input through an OLTP engine). For example, the metadata may be extracted from DDLs received by the OLTP engine. At 904, metadata versions may be generated based on the extracted metadata. At 906, the metadata versions may be aligned with an order of data manipulation languages (DMLs). For example, the metadata versions may be aligned by the same LSN system used for DMLs. The metadata versions may be made globally available and may be persisted. For example, the metadata versions may be persisted into a dedicated database and pushed to/pulled by FlinkSQL and AP storage servers. Replicas of the metadata versions may be generated for high availability.

Figure 10:
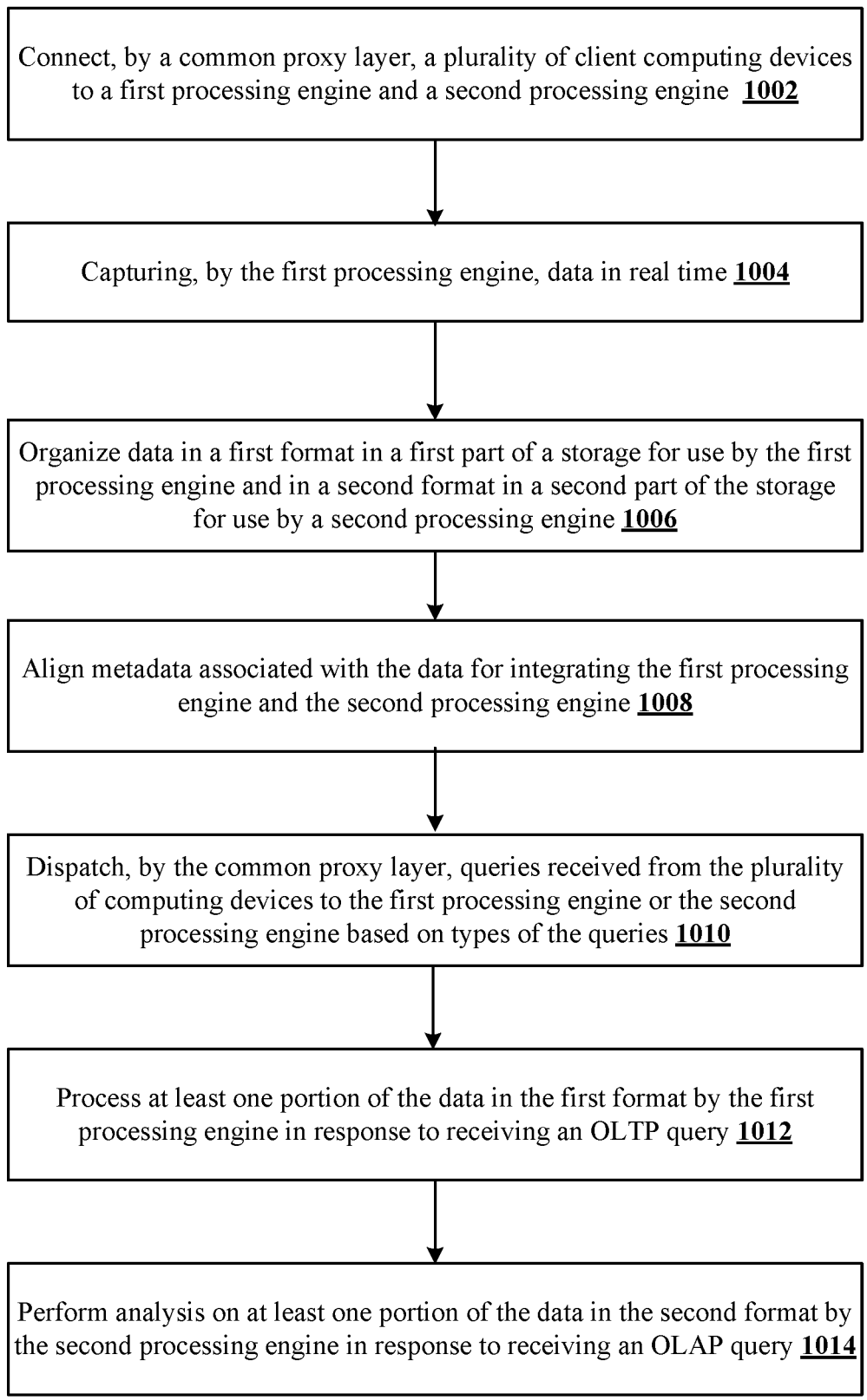
FIG. 10 shows an example process for performing hybrid transactional and analytical processing.

FIG. 10 illustrates an example hybrid transaction/analytical process 1000 in accordance with the present disclosure. The process 1000 may be performed by a HTAP system (e.g., HTAP system 110). The HTAP system may perform the process 1000 to receive and/or organize user data in a manner that is able to be utilized by an OLTP subsystem and an OLAP subsystem. Although depicted as a sequence of operations in FIG. 10, those of ordinary skill in the art will appreciate that various embodiments may add, remove, reorder, or modify the depicted operations.

A common proxy layer may be configured to connect clients to an OLTP engine and/or an OLAP engine. At 1002, a plurality of client computing devices may be connected to a first processing engine and a second processing engine via a common proxy layer. The proxy may provide a single unified API (default: ANSL SQL plus some common OLAP extensions) to users/clients, i.e., the underlying system details are transparent to the clients if they connected through the proxy. Various kinds of APIs (e.g., ANSI SQL, JDBC, ODBC, etc.) may be utilized, based on user requirements. Utilizing a single unified API may reduce user efforts in using the system.

At 1004, data may be captured by a first computing system in real-time (or near real-time). The first computing system may be, for example, an OLTP engine (e.g., OLTP engine 402). Since OLTP workloads inherently perform better with row-based data format and OLAP workloads prefer columnar data format, using one format for both workloads means that performance of the HTAP system is compromised. To prevent this compromise of performance, user data may be stored in different formats for the OLTP engine and the OLAP engine. At 1006, the captured data may be organized in a first format in a first part of a storage subsystem for use by the first processing engine and in a second format in a second part of the storage subsystem for use by a second processing engine (e.g., OLAP engine 503). For example, user data may be kept in a first format (e.g., in row format) for the OLTP engine and a second format (e.g., a columnar format) for the OLAP engine for efficient query processing.

Metadata may be extracted from the captured data captured. The metadata may be extracted from events (e.g., DDLs) generated by certain resources (e.g., user input through an OLTP engine). For example, the metadata may be extracted from DDLs received by the OLTP engine. Metadata versions may be generated based on the extracted metadata. At 1008, metadata associated with the captured data may be aligned for integrating the first processing engine and the second processing engine. For example, the metadata versions may be aligned with an order of data manipulation languages (DMLs). The metadata versions may be aligned by the same LSN system used for DMLs. The metadata versions may be made globally available and may be persisted. For example, the metadata versions may be persisted into a dedicated database and pushed to/pulled by FlinkSQL and AP storage servers. Replicas of the metadata versions may be generated for high availability.

The proxy may have the ability to automatically dispatch different client requests/queries to different engines (e.g., the OLTP engine or the OLAP engine) based on the nature of the request. At 1010, the common proxy layer may dispatch queries received from the plurality of computing devices to the first processing engine or the second processing engine based on types of the queries. For example, a complex OLAP query will be directed to the OLAP engine, while DMLs, DDLs and point-lookups queries would likely be directed to the OLTP engine.

The proxy may direct at least one portion of the data to the first processing engine. At 1012, at least one portion of the data in the first format may be processed by the first processing engine in response to receiving an OLTP query. The first processing engine may be configured to process at least some of the received user data in the first format (e.g., row-based format). For example, upon receiving an OLTP query, the OLTP engine may be configured to process at least some of the received user data in response to the OLTP query. An OLTP query may include, by way of example and without limitation, a query to retrieve a particular data item, query to filter the received data to look for a particular data item/description of a data item, and/or a query to filter the received data to identify a particular subset of the received data. For example, the queries may be DML queries and/or point look up queries. The results of the processing may be sent or forwarded to the client devices that generated the query.

The proxy may direct at least one portion of the data to the second processing engine. At 1014, analysis on at least one portion of the data in the second format may be performed by the second processing engine in response to receiving an OLAP query. The second computing system may perform an analytical operation on at least one portion of the data. OLAP consists of three basic analytical operations: consolidation (roll-up), drill-down, and slicing and dicing. Consolidation involves the aggregation of data that can be accumulated and computed in one or more dimensions. For example, all sales offices are rolled up to the sales department or sales division to anticipate sales trends. By contrast, the drill-down is a technique that allows users to navigate through the details. For instance, users can view the sales by individual products that make up a region's sales. Slicing and dicing is a feature whereby users can take out (slicing) a specific set of data of the OLAP cube and view (dicing) the slices from different viewpoints. These viewpoints are sometimes called dimensions (such as looking at the same sales by salesperson, or by date, or by customer, or by product, or by region, etc.). The results of the processing may be sent or forwarded to the client devices that generated the query.

Figure 11:
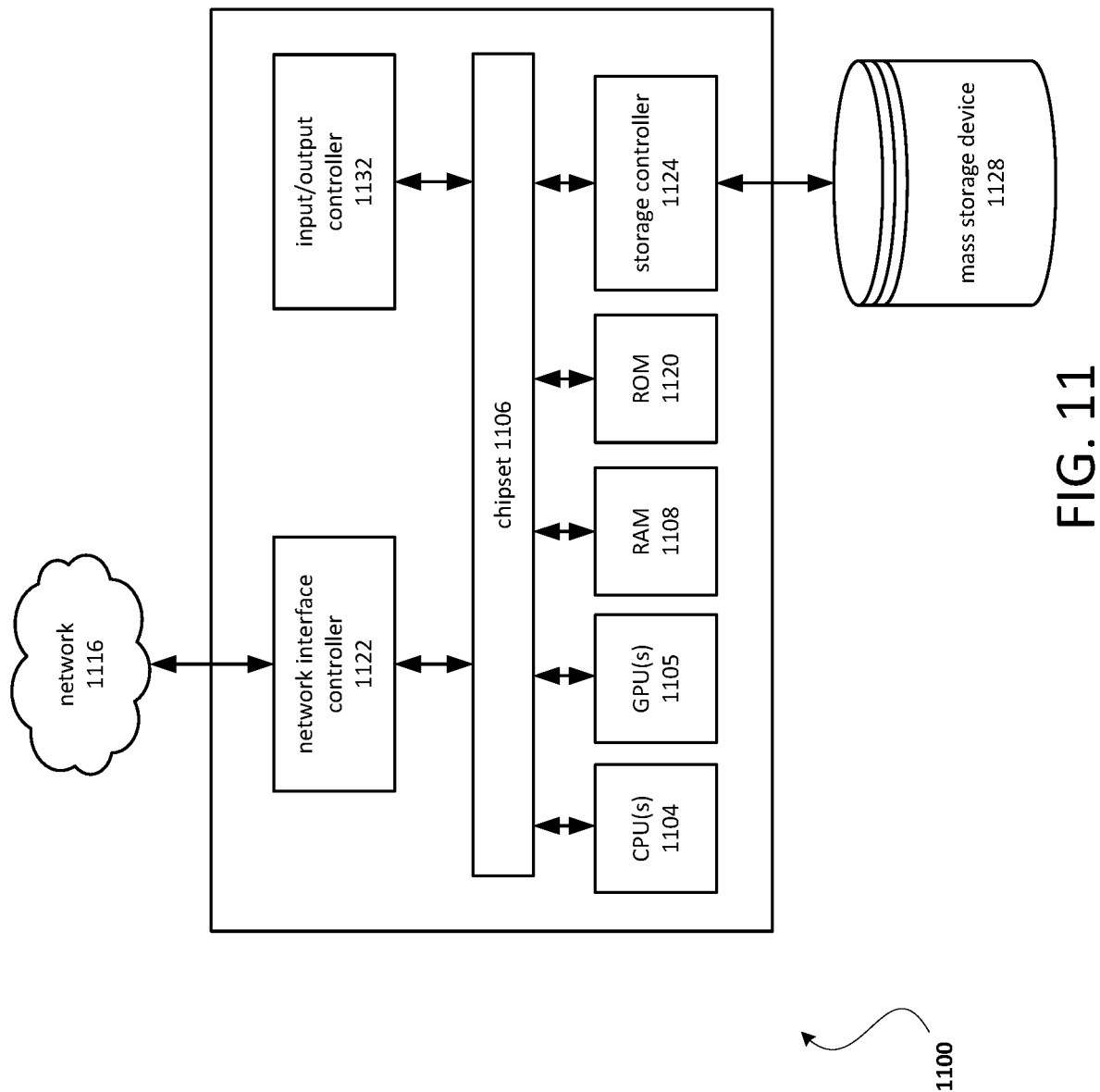
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, cloud network 102, the network 120, the client devices 104*a-d*, the service 112, the HTAP system 110, and/or the node 118 may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1010. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state.

The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow: plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system, comprising:
   at least one processor; and
   at least one memory communicatively coupled to the at least one processor and comprising instructions that upon execution by the at least one processor cause the system to perform operations comprising:
   capturing data by a first processing engine in real time, the first processing engine configured to perform online transactional processing;
   organizing the data in a first format in a first part of a storage for use by the first processing engine;
   propagating the same data to a second part of the storage;
   organizing the same data in a second format in the second part of the storage for use by a second processing engine, the second processing engine configured to perform online analytical processing, wherein the first processing engine, the second processing engine, and the storage are modularized and configured to be decoupled from each other; and
   a common proxy layer configured to connect a plurality of client computing devices to the first processing engine and the second processing engine.

2. The system of claim 1, further comprising:
   a centralized metadata service configured to align metadata for integrating the first processing engine and the second processing engine.

3. The system of claim 2, the operations further comprising:
   extracting, by the centralized metadata service, metadata from the data;
   generating, by the centralized metadata service, metadata versions based on the extracted metadata; and
   aligning, by the centralized metadata service, the metadata versions with an order of data manipulation languages.

4. The system of claim 1, the operations further comprising:
   dispatching, by the common proxy layer, queries received from the plurality of client computing devices to the first processing engine or the second processing engine based on types of the queries.

5. The system of claim 1, the operations further comprising:
   processing at least one portion of the data in the first format by the first processing engine in response to receiving a query for online transactional processing.

6. The system of claim 1, the operations further comprising:
   performing analysis on at least one portion of the data in the second format by the second processing engine in response to receiving a query online analytical processing.

7. The system of claim 1, the operations further comprising:
   generating physical logs and logical logs based on the data;
   replicating the physical logs or the logical logs for construction of data pages; and
   organizing data in the data pages in the first format for use by the first processing engine.

8. The system of claim 7, the operations further comprising:
   replicating the logical logs and distributing to the second part of the storage; and sorting replications of the logical logs to a plurality of partitions based on a predetermined partitioning scheme.

9. The system of claim 8, the operations further comprising:
applying at least one portion of the replications of the logical logs in order into a Delta Store of a corresponding partition among the plurality of partitions, wherein data in the Delta Store are stored in a row format and ordered based on log serial numbers associated with the at least one portion of the replications of the logical logs; and
flushing data from the Delta Store to a Base Store based on one or more predetermined rules, wherein data in the Base Store are organized in a columnar format for use by the second processing engine.

10. A method comprising:
capturing data by a first processing engine in real time, the first processing engine configured to perform online transactional processing;
organizing the data in a first format in a first part of a storage for use by the first processing engine;
propagating the same data to a second part of the storage;
organizing the same data in a second format in the second part of the storage for use by a second processing engine, the second processing engine configured to perform online analytical processing, wherein the first processing engine, the second processing engine, and the storage are modularized and configured to be decoupled from each other; and
connecting, by a common proxy layer, a plurality of client computing devices to the first processing engine and the second processing engine.

11. The method of claim 10, further comprising:
aligning, by a centralized metadata service, metadata for integrating the first processing engine and the second processing engine.

12. The method of claim 11, further comprising:
extracting, by the centralized metadata service, metadata from the data;
generating, by the centralized metadata service, metadata versions based on the extracted metadata; and
aligning, by the centralized metadata service, the metadata versions with an order of data manipulation languages.

13. The method of claim 10, further comprising:
dispatching, by the common proxy layer, queries received from the plurality of computing devices to the first processing engine or the second processing engine based on types of the queries.

14. The method of claim 10, further comprising:
generating physical logs and logical logs based on the data;
replicating the physical logs or logical logs for construction of data pages; and
organizing data in the data pages in the first format for use by the first processing engine.

15. The method of claim 14, further comprising:
replicating the logical logs and distributing to the second part of the storage; and
sorting replications of the logical logs to a plurality of partitions based on a predetermined partitioning scheme.

16. The method of claim 15, further comprising:
applying at least one portion of the replications of the logical logs in order into an Delta Store of a corresponding partition among the plurality of partitions, wherein data in the Delta Store are stored in a row format and ordered based on log serial numbers (LSN) associated with the at least one portion of the replications of the logical logs; and
flushing data from the Delta Store to a Base Store based on one or more predetermined rules, wherein data in the Base Store are organized in a columnar format for use by the second processing engine.

17. A non-transitory computer-readable storage medium, comprising computer-readable instructions that upon execution by a system cause the system to implement operations comprising:
capturing data by a first processing engine in real time, the first processing engine configured to perform online transactional processing;
organizing the data in a first format in a first part of a storage for use by the first processing engine;
propagating the same data to a second part of the storage;
organizing the same data in a second format in the second part of the storage for use by a second processing engine, the second processing engine configured to perform online analytical processing, wherein the first processing engine, the second processing engine, and the storage are modularized and configured to be decoupled from each other; and
connecting, by a common proxy layer, a plurality of client computing devices to the first processing engine and the second processing engine.

18. The non-transitory computer-readable storage medium of claim 17, the operations further comprising:
dispatching, by the common proxy layer, queries received from the plurality of computing devices to the first processing engine or the second processing engine based on types of the queries.

* * * * *